United States Patent [19]
Elazar et al.

[11] 3,835,704
[45] Sept. 17, 1974

[54] FLUID FLOW METERS

[75] Inventors: Shmuel Elazar; Dee J. Neville, both of Oxnard, Calif.

[73] Assignee: Statham Instruments, Inc., Oxnard, Calif.

[22] Filed: July 22, 1971

[21] Appl. No.: 165,069

[52] U.S. Cl. ............................................. 73/194 A
[51] Int. Cl. ................................................. G01f 1/00
[58] Field of Search .................................. 73/194 A

[56] References Cited
UNITED STATES PATENTS

| | | | |
|---|---|---|---|
| 2,826,912 | 3/1958 | Kritz | 73/194 A |
| 3,007,339 | 11/1961 | Hill | 73/194 A |

FOREIGN PATENTS OR APPLICATIONS

| | | | |
|---|---|---|---|
| 191,155 | 7/1967 | U.S.S.R. | 73/194 A |
| 1,355,584 | 2/1964 | France | 73/194 A |
| 1,355,634 | 2/1964 | France | 73/194 A |

*Primary Examiner*—Charles A. Ruehl

[57] ABSTRACT

A fluid flow meter employing a single pair of sonic signal transducers and methods for alternately energizing each of said transducers to convert them alternately into sonic generators and receptors and receiving and algebraically summing the output of said transducers acting as receptors as a function of fluid velocity.

6 Claims, 8 Drawing Figures

PATENTED SEP 17 1974
3,835,704
SHEET 1 OF 3
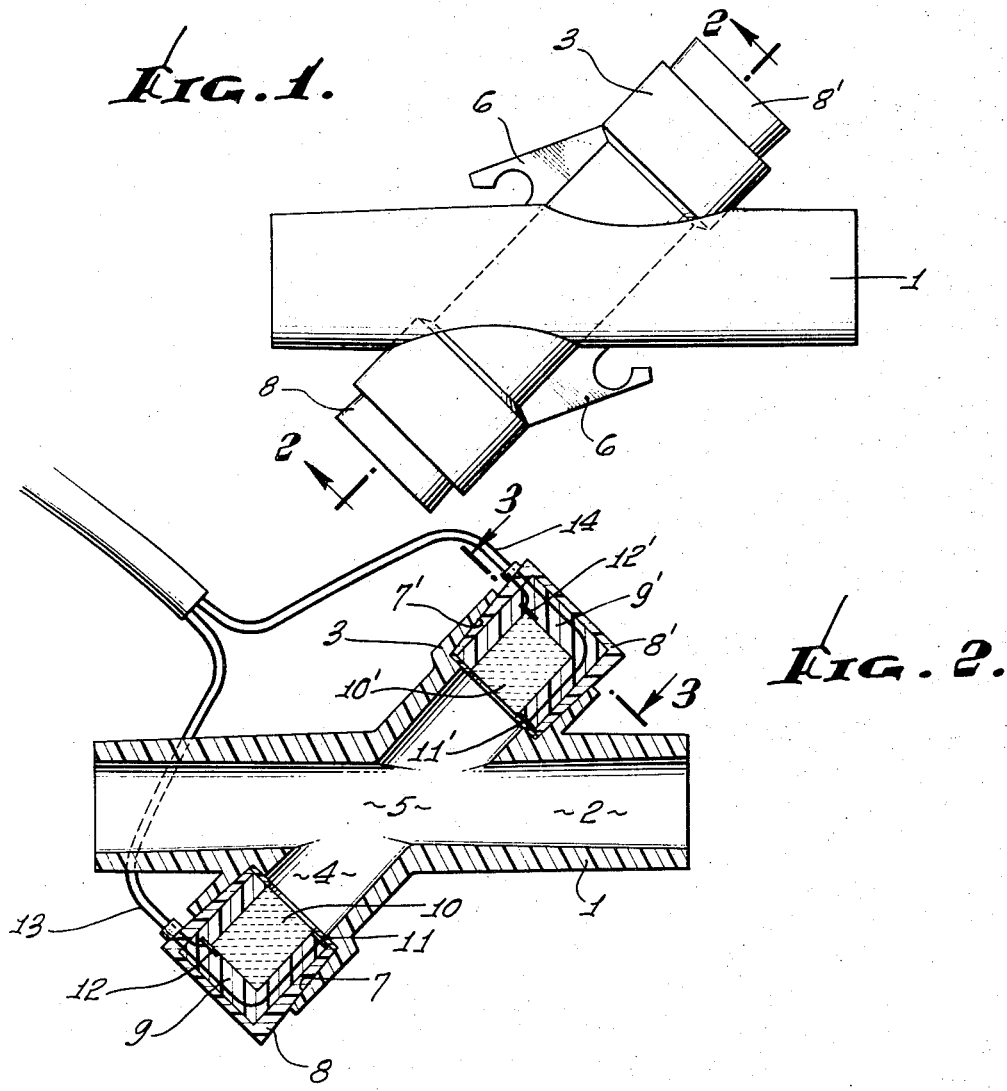
FIG.1.
FIG.2.
FIG.3.
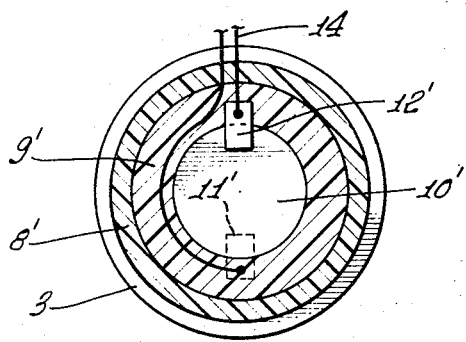
INVENTORS.
SHMUEL ELAZAR
DEE J. NEVILLE
By
Philip Subkow
ATTORNEY.

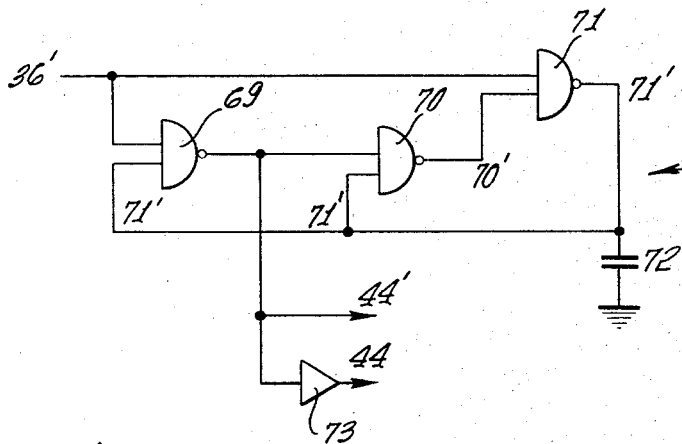
Fig. 5.
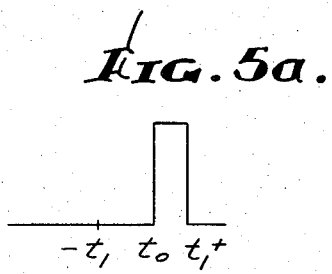
Fig. 5a.
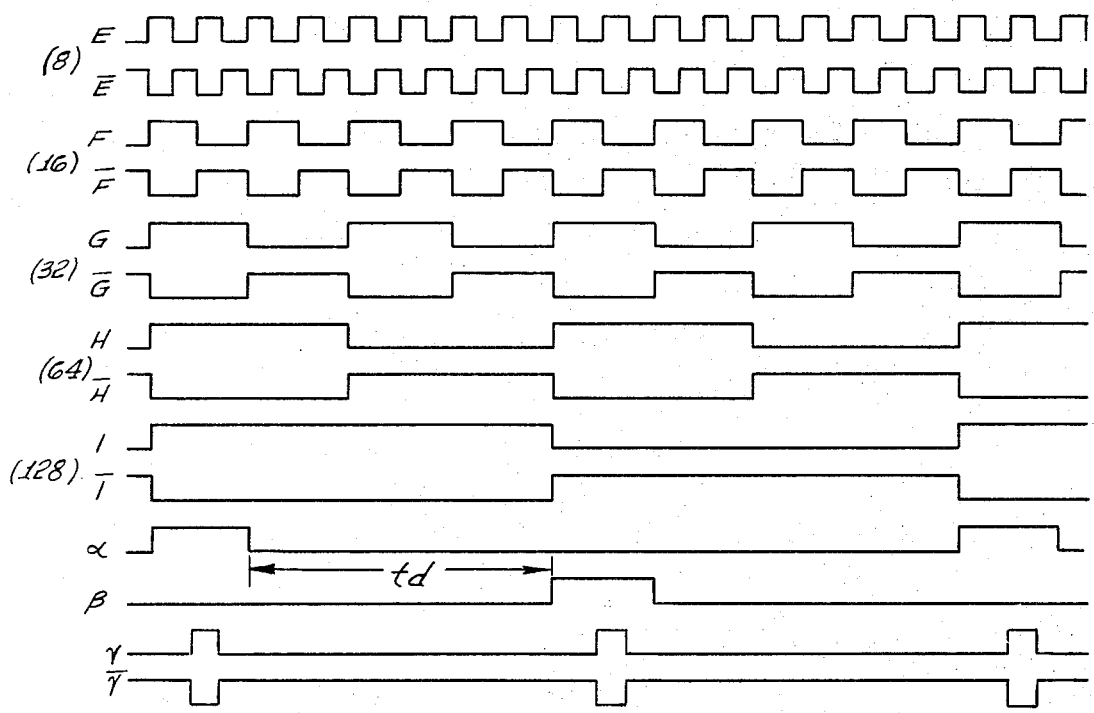
Fig. 6.
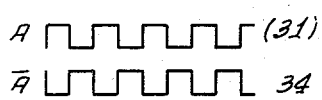
Fig. 7.
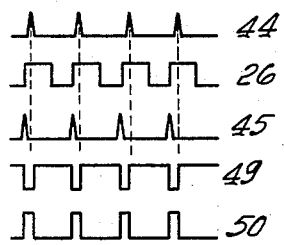
INVENTORS.
SHMUEL ELAZAR
DEE J. NEVILLE
By
Philip Subkow
ATTORNEY.

FLUID FLOW METERS

BACKGROUND OF THE INVENTION

This invention relates to devices for determining fluid velocities in conduits. This invention is particularly useful in determining the velocity of gases where the velocity is relatively low, as in the case of spirometers.

In the prior art transducers for such purposes, the difference in the transmission time of a sonic signal propagated in two different directions through the flowing stream have been used in various ways to determine the velocity of a fluid stream. In such prior art transducers, artifacts are present in the form of uncontrollable environmental and instrumental factors which affect the accuracy of the results. These depend on the configuration of the transducer, the velocity and viscosity of the fluid, changes in composition which may occur, and turbulences in the air stream. In such cases, there may be no direct relationship between the mean velocity of the fluid and the transmission time of the sonic signals. Changes in the chamber dimensions affected by temperature changes resulting in changes in the distance between one pair of crystal transmitters and receivers differently from other pairs; changes in shape of the chamber occasioned mechanical stresses from localized points of pressure may vary the distances between the transmitters and receptors sufficiently to introduce errors.

In systems in which the receiving signal faces the transmitter crystal, the receiving crystal receives first the original signal, the acoustic wave is reflected from the receiving crystal to the transmitting crystal and is reflected therefrom back to the receiving crystal, and this may occur many times. Reflections will also occur from the sidewalls of the housing. If the time of the arrival of a reflected signal overlaps, a following generated signal, the reflected signal modulates the following signal and introduces an error.

Another difficulty with the prior art systems is that the cross-sectional area of the fluid which is illuminated by the transducer is a part of and may not be representative of the mean flow of the fluid volume. As is well known, the fluid velocity at the center of the stream is greater than at the walls of the confining conduit. This is true in the case of laminar flow. This factor is considerably influenced by whether or not excessive turbulence is present, in which case uniform flow across the entire cross section will not occur. In addition to the uncertainty of the relation of the signal delay time due to acoustic velocity in the air stream, there is the additional uncertainty introduced because of the asymmetry of circuitry which influences the character of the signal from which the fluid velocity is derived.

DETAILED DESCRIPTION

It is the purpose of this invention to avoid a great many of these artifacts and to cancel out others.

It is an object of our invention to measure the difference in the transit time of sonic energy transmitted from a transmitter transducer to a receiver transducer through a fluid conduit at a non-rectangular angle to the flow path with the sonic energy transversing a common path in either direction. By this arrangement we are able to cancel our artifacts arising from changes in transducer spacing, temperature changes, changes in gas composition, and pressure changes.

A further objective, when piezoelectric crystals are employed as the transducing element is to eliminate the effects of reflection from crystal faces and of solid born parasitic conduction of the generated sonic energy.

A further object of our invention is to collimate the sonic energy and thus to eliminate side wall reflection effects An objective of the invention is to illuminate a major portion of the cross-section of the airstream so that the mean flow is more closely observed.

A further object of our invention is to provide a crystal energizing system and read-out which limits and ideally eliminates the aforesaid artifacts and circuit artifacts.

The system is designed so at first the signal is transmitted from a transmitter to a receiver and then the direction of the signal is reversed, and the original transmitter becomes a receiver, and the original receiver becomes a transmitter. A proper interval is introduced between reversals so that latent and reflected energy is limited.

The difference in transit time of the sonic signal is determined electronically. The electronic system establishes a base relationship between the electrical signal which is responsive to the acoustic signal passing in one direction and a reference signal. Suitable means are provided for correction resulting from circuit delay times which modulates the signal as a result of artifacts such as described above. This eliminates this circuit factor as a source of errors. The phase displacement resulting from each of the oppositely directed acoustic signals commonly referenced produces a voltage responsive to the delay times resulting from the two acoustic transit times. The voltage difference is determined as a function of fluid velocity.

These and other objects of the invention will be described in connection with the drawings:

FIG. 1 is a side elevation of the transducer housing;

FIG. 2 is a cross section of the housing with transducers in place;

FIG. 3 is a section of line 3—3;

FIG. 5 is a fragmentary schematic view of one of the circuit elements; and

Figure 4:
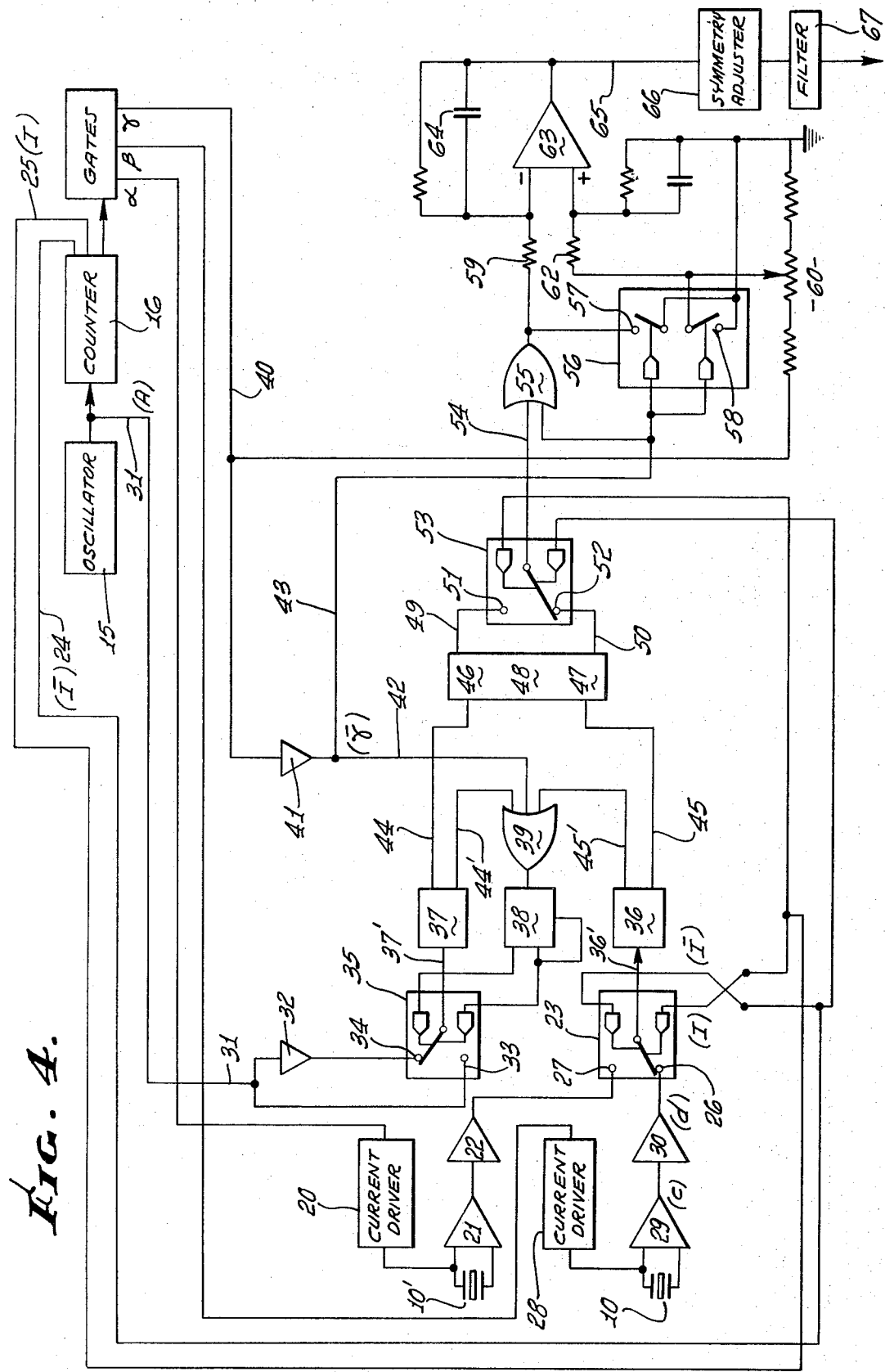
FIG. 4 is a schematic circuit diagram of the circuitry which we prefer to employ with the transducer of FIG. 2.

FIGS. 5a, 6, and 7 are time diagrams of the pulses and pulse trains employed in the system.

The transducer is formed of two intersecting tubes 1 and 3, which are preferably of substantially the same internal diameter. These tubular conduits 2 and 4 intersect at 5 at substantially 45°. Tube 3 carries suspending hooks 6. Tube 1 may carry adapters suitable for connection to any source of fluid flow, not shown in the drawings, but will be understood by those skilled in the art.

Conduit 2 carries the fluid flow, and conduit 4 is a wave guide as will be described hereinbelow. The tube 3 is bored out at 7 and 7' to receive the piezoelectric crystals 10 and 10' positioned within the rigid foam container 9 and 9', which are encased in the metal housing 8 and 8' respectively. The diameter of the opposed crystal faces are preferably the same and of substantially the diameter of conduit 4, and face each other at a non-rectangular angle, i.e., not perpendicular to the axis of the flow tube 2. As illustrated in FIG. 1, this is preferably about 45°.

Suitable rigid foams are polyurethane foams. Suitable piezoelectric crystals are lead zirconate crystals with silver-coated faces to which leads 13 and 14 are soldered and connected at 11 and 12 and at 11' and 12'.

A preferred read-out circuit is described herein. 15 is an oscillator which generates a high-frequency square wave at 31. This pulse train is converted in the counter 16 to a series of pulses of period 2, 4, 8, 16, 32, 64 and 128 times the period of the pulses at 31. These are illustrated in FIG. 6, where the pulses are designated as E, F, G, H, and I, corresponding to the 8, 16, 32, 64, and 128 multiples of the period of the signal at 31, designated as A. The counter 16 is also capable of selecting, in addition to the designated pulses, the corresponding $\overline{E}, \overline{F}, \overline{G}, \overline{H}$ and $\overline{I}$, which are the same frequencies, but 180° out-of-phase with the frequencies E, F, G, H, and I. These are illustrated by the frequencies marked with the corresponding bar value on FIG. 6. For purposes of other designation, the signal of 31 is designated as A, and $\overline{A}$ 180° out-of-phase and with the same frequency as A is also generated and designated as $\overline{A}$ (see FIG. 7). Further defining the nature of the frequency of the pulse trains when at the maximum potential, are hereafter designated as either "on" or (1), and when they are at reference potential, for example, at 0 potential, they will be designated as "off" or (0). For example, (1) may be at 10 volts and (0) may be at differential ground potential.

The I frequency appears at 25 and the $\overline{I}$ frequency appears at 24. For purposes of further illustration, and not as a limitation of our invention, assume that the signal at 31 is at 100 kilohertz designated by 100 KHz. It will be understood that our invention is not limited to any particular frequency at 31 and we have selected 100 KHz in order to simplify the explanation and because the frequency we contemplate is that which we wish to employ in our presently preferred embodiment. By combining $\overline{A}, \overline{G}, \overline{H}$, and $\overline{I}$, when each of them are at (0) a signal ($\alpha$) is produced in which the period of each of the succeeding pulse trains is, for example, 32 times the period of the individual 100 KHz square wave pulses contained in the pulse train alpha. By combining $\overline{A}, \overline{G}, \overline{H}$ and $\overline{I}$, all at (0), the pulse train beta ($\beta$) is produced of the same period as alpha ($\alpha$), and therefore the period is 32 times the period of the individual 100 KHz square wave pulses contained in the beta ($\beta$) pulse train. It will be observed that in the above example that the period of the alpha and beta pulse trains are each of the same period as the G pulse train. Furthermore, the alpha ($\alpha$) pulse train is initiated when I goes from (0) to (1), and the beta pulses are initiated when I goes from (1) to (0) which is, of course, also as $\overline{I}$ which goes from (0) to (1). See FIG. 6. The time interval between 1-0 of ($\alpha$) and 0-1 of ($\beta$) illustrated as $t_d$ in FIG. 6 is further described below.

For reasons to be described below, an additional selection is made by the gate to pass at 40 a pulse train gamma ($\gamma$) by selecting the time when $\overline{E}, \overline{F}, \overline{G}$, and $\overline{H}$ are all zero to give a series of pulse trains which occur in the third quarter of the alpha and beta pulses, and for the period of this said quarter. See FIG. 6.

Assume, for the purpose of description, that no flow occurs in tube 2, and that the circuit activates crystal 10' to act as a sonic energy generator, and that 10 acts as the receiver. Alpha ($\alpha$) is applied to the constant current generator 20, to energize the crystal 10' at a frequency of the pulse train A at 31, for example, 100 KHz, assuming the convention we have chosen above. A sonic energy beam is generated and propagated by 10' for the duration of the alpha train of pulses. The current is also applied to the amplifier 21 from the constant current generator and the output of the amplifier 21 passes through the phase lock loop 22 to be further described.

The switch 23 completes the circuit at 26 under the influence of the I frequency applied via 25. It will be recognized that the switch 23, as are switches 35, 53 and 56, is schematically illustrated and any suitable gating switch may be used. For purposes of illustration of the function of the switches, we will refer to the diagrams of FIG. 4. Those skilled in the art will know how to use conventional units which will function in the described manner. During the period that alpha is applied, the I is applied to close the circuit at 26, but $\overline{I}$ being 180° out-of-phase, the switch 23 is actuated to close the circuit at 26, the circuit at 27 being open, thus disconnecting the phase lock loop 22 from 36 and connecting the phase lock loop 30 to 36. On arrival of the sonic energy beam at the crystal 10, and for the duration of the pulse, the crystal 10 will generate at 100 KHz sinusoidal train shown at c, FIG. 4. As has been explained above, during this period of time, beta is not being generated, and the current driver 28 is off. The energy applied to 29 from the crystal 10 is amplified in 29 to generate a sinusoidal pulse train at the frequency applied at 20, i.e., that appearing at 31. The signal at c is converted to square wave pulses marked (d) which are at the frequency of, and in phase with, the sinusoidal pulses c. A suitable phase lock loop oscillator is described in "Electronic Design" of July 20, 1964 at pages 56 et seq.

As will appear from FIG. 4, the frequency at 31 is also applied to the inverter 32 to apply the inverted frequency, i.e., $\overline{A}$ at 34 of the gate 35. Gate 35 is set by the NOR gate 39, and the D-type flip-flop 38, as will be described below, to connect the inverter 32 to the gate 37, as shown in FIG. 4. The output from 30 is applied to the pulse differentiator 36, and the $\overline{A}$ is applied to the like unit 37. The function of the pulse differentiator will be described in greater detail below. At this point, it is sufficient to state that the output at 36 appearing at 45' and the output at 37 appearing at 44' are high frequency negative-going spikes which are applied to the NOR gate 39 which activates the D-type flip-flop 38. The NOR gate is activated when the spike at 44' and 45' are both at (0), as is also the inverted gamma, i.e., appearing at 42. The ($\overline{\gamma}$) is produced by the inverter 41, to which the ($\gamma$) frequency at 40 is applied. The spiked pulse output from 37 appearing at 44 (see FIG. 7) is applied to the set side 46 of the flip-flop 48 and the spiked pulse output from 36 appearing at 45 is applied to the reset side 47 of the flip-flop 48 (FIG. 7).

The spikes at 44 constitute a stable reference, and the time delay between the arrival of the reference pulses at 46 and the spike pulse appearing at 45 (see FIG. 7) responsive to the actuation of 10, is a function of the delay resulting from the time delay of transmission of the acoustic pulse from 10' to 10 and the time delay in the circuit. When the signal pulse from 36 arrives at 47, it resets the flip-flop. The NOR gate 55 is controlled by ($\bar{\gamma}$). The pulse $\bar{I}$ at 24 sets the switch 53 at 52 through 54, thus disconnecting at 51. Gamma bar ($\bar{\gamma}$) sets the switch 56 at 57 and 58. The signal at 50 (see FIG. 7) is applied via 52, 54, 55 and 59, to the integrator 64 and operational amplifier 63, switches 57 and 58 being open. When $\bar{\gamma}$ becomes (1), a positive voltage is applied through voltage divider 60 and through 62 to positive side of operational amplifier 63, thus converting a positive going signal from 55 to a bipolar (±) signal at the output of 63 (65).

Switch 23 is at 27 when the beta ($\beta$) pulse is applied. The beta pulse now actuates crystal 10 and transmitter 10' now becomes the receiver. The NOR gate 39 and flip-flop 38 operate in the same manner as described above. I turns on switch 53 which connects the output of 48 which is 49 through 51, 54, 55 to 59 and 64, but since the output at 49 is at 180° out-of-phase to 50, the net voltage at the integrator 64 is zero. The output of 63 at 65 passes via 65 to the symmetry adjuster 66 and filter 67 to any read-out equipment will then show that there is zero flow.

The above description assumes that the time delay between the arrival of the energizing pulse at 10 or at 10' and the arrival of the responsive pulse at 49 or at 50 are identical. Since assuming no flow and symmetry in the acoustic transducer the asymmetry of the electric circuit may be a possible source of asymmetry in the delay of the pulses due to alpha and beta. In order to cancel out this artifact, we have provided the potentiometer 60 which may be adjusted to cancel out the parasitic voltage appearing at 59, to give only the desired reference potential at 65. This is then taken as the potential corresponding to 0 fluid flow.

Provision is also made for avoiding the unbalance of the operational amplifier at 63, when no signal is applied at 59, that is, when gamma bar via 43 is (0). In such case, the switch is at 57 and 58, and the system is grounded through 58, so that the signal is reported only when gamma is at (1).

The frequency phase control device composed of units 32, 36, 37, 38, 39 and 41 is for the purpose of assuring that the pulses at 44 and 45 do not arrive at the same time, so that the set and reset function at 48 are not simultaneous. It is conductive to give a (1) output only when the impulses through 44', 45' and 42 are at (0). This is accomplished by applying the gamma bar ($\bar{\gamma}$) and the negative pulses simultaneously at 39, as described above. Units 37 and 36 are each composed and connected as shown in FIG. 5, and are composed of the NAND gates 69, 70 and 71, and the output at 45' is taken through the inverter 73.

The functioning of the frequency control device will be understood from the analysis illustrated in the following table together with FIGS. 4, 5 and 5a. Assuming $t_o$ is greater than the time of arrival of the pulse at 36', the polarity of the pulse at various times at the various elements of the device is shown in the following table.

| $t$ | 36' | 71' | 44' | 70' | 44 |
|---|---|---|---|---|---|
| $-t_1$ | (0) | (1) | (1) | (0) | (0) |
| $t_o$ | (1) | (1) | (0) | (1) | (1) |
| $+t_1$ | (1) | (0) | (1) | (1) | (0) |

From the table above, it is obvious that when the input 36' changed from (0) to (1), the output 44' changes from (1) to (0) and back to (1). The time delay to $t_1+$ is introduced by the capacitor 72. The result is a positive going short duration pulse at 44 which may be equivalent to a spike. (See FIG. 5a).

The above description applies as well to the gate 37 when the signal is applied through 37'. The interval $t_d$ (see FIG. 6) is determined by making it just long enough so that all reflection activities referred to above subside.

Let the travel time from 10 to 10' be $t_T$ thus the energy from 10 requires a transit time $t_{T(1)}$ to travel to 10'. A like period $t_{T(2)}$ for the reflected signal from 10' to travel back to 10 and it takes another period $t_{T(3)}$ for the reflected reflection to travel from 10 to 10'. The undistorted information can be obtained only between the end of the $t_{T(1)}$ and the end of $t_{T(3)}$. Thus the period of the alpha or beta pulse train need not be longer than $3 \times t_T 1$. We use $4 \times t_{T(1)}$ because it simplifies the circuitry of counter 16.

If, because of some artifact, the delay times are such that the pulses at 44' and 45' do generate simultaneously, i.e., be coincidental, 39 will be activated (during the time $\bar{\gamma}$ is zero). Since the potential of 44' and 45' should not both be (0) at the same time, in order to avoid ambiguity in the output, the flip-flop 38 will reverse switches 35 to complete connection at 33. The pulse applied at 34 will be the inverted pulse from 31, i.e., $\bar{A}$, and therefore the pulse at 44' and 45' will now be 180° out-of-phase with that at 44 and 45, respectively. This will assure that the flip-flop set and reset sides are not simultaneously activated.

The gamma wave is selected to correspond to the third quarter of the alpha or beta pulse train, i.e., during the period $t_{T(3)}$. It will be observed that the Integrator 59 and 64 will not receive any signal from 49 or 50, unless the NOR gate 55 is activated. This will occur only when the inverted gamma pulse train (gamma bar) is applied, and therefore only the energy output from 10 or 10' during the third quarter of alpha or beta pulse train will be sampled and integrated at 59 and 64, for it is only during that period that the NOR gate 55 is open. Since the purity of the frequencies at the initial or end of the alpha or beta train is influenced by various factors which militate against the purity of the pulse train at 31, the portion of the train is selected which is least influenced by these artifacts, i.e., that portion or fraction as, for example, the third quarter of the alpha or beta pulses corresponding to the gamma pulse.

We have described the calibration of the system for no flow and how the output at 65 is the reference potential established by the potentiometer 60 when there is no flow. If flow occurs, the acoustic delay time in the period when 10' is actuated as a transmitter and also when 10 transmits will be a function of the velocity of flow of the fluid. As is illustrated in FIG. 7, the displacement of the spike at 45 from the spike at 44 is a measure of the delay time in the acoustic and circuit paths. When the delay times are the same during alpha and beta actuation, the resultant signal at 59 reference to the potential at 60 will indicate zero flow. If the displacement be different when alpha or beta is transmitting the signal at 59 integrated at 64 when referenced to the potential at 60 is a function of the translational velocity in space 5. The difference signal will be positive and its value referenced to the potential set at 60 will be a function of the difference in the fluid velocity vector referenced to the crystal positions and is thus a measure of the translateral velocity in the space 5, FIG. 2.

Since, as has been shown above, asymmetry of the circuitry which causes a delay time difference, when 10 is transmitting and when 10' is transmitting has been adjusted during the calibration, by the setting of the potentiometer 60, all electrical artifacts have been removed. The mechanical artifacts previously described, and the voltage at 65 will be true measure of the fluid velocity. Since 5 is a fixed diameter, the output is proportional to flow.

We claim:

1. A flow meter comprising a pair of piezoelectric crystals mounted in association with a fluid conduit and spaced from each other in a non-rectangular direction to the axis of the fluid conduit;
   means to apply an electrical pulse train to one of said crystals to generate a sonic signal which is transmitted through said fluid conduit in said non-rectangular direction and received by the other of said crystals to generate a first electrical signal responsive to said sonic signal;
   means to establish a reference signal;
   means to discontinue the application of electrical pulses to said one crystal and to apply a second electrical pulse train to said other crystal to generate a second sonic signal which is transmitted through said fluid conduit along the aforementioned non-rectangular direction and received by said one crystal to generate a second electrical signal responsive to said second sonic signal transmitted through said fluid conduit;
   means to compare said first and second electrical signals with said reference signal to produce signals which are responsive to the delay times in the transmission of said sonic signals through said fluid conduit;
   means for deriving a third signal from said signals which are responsive to the delay times of said sonic signals, said third signal being responsive to the fluid velocity in said fluid conduit.

2. The flow meter of claim 1 in which the crystals are positioned at terminal ends of a tube intersecting the fluid conduit at a non-rectangular angle and having a diameter substantially equal to the diameter of the fluid conduit at said intersection.

3. The flow meter of claim 1, including an oscillator for generating a high frequency square wave; means responsive to said high frequency square wave for producing respective pulse trains herein referred to as alpha, beta and gamma pulses, said alpha and beta pulses comprising a series of pulse trains of said high frequency square wave for predetermined periods, said pulse trains spaced in time from each other responsive to the time of transmission of the sonic signals from one crystal to the other crystal, and said gamma pulses occurring during a portion only of the duration of each of the alpha and beta pulses;
   whereby said means to apply an electrical pulse train to one of said crystals applies said alpha pulses to said one crystal and said means to discontinue the application of electrical pulses to said one crystal and to apply a second electrical pulse train to said other crystal terminates said application of said alpha pulses and applies said beta pulses to the other of said crystals;
   means to terminate the application of said beta pulses thereby generating said sonic signals alternatively by said crystals;
   means associated with said crystals to generate said first and second electrical signals as alternate trains of square wave pulses responsive to said sonic signals received at said crystals;
   means responsive to said gamma train of pulses to transmit a high frequency pulse during the application of said gamma signal;
   said means to establish a reference signal including means to generate a reference pulse responsive to said high frequency square wave from said oscillator, said reference pulse being at substantially a higher frequency than said high frequency square wave and
   said means to compare said first and second electrical signals with said reference signal including means to compare the time delay between said reference pulse and the square wave pulses responsive to said received sonic signal generated alternatively by the alpha and beta pulses to thereby produce said signals which are responsive to the delay times.

4. The flow meter of claim 3 in which the crystals are positioned at terminal ends of a tube intersecting the fluid conduit at a non-rectangular angle and having a diameter substantially equal to the diameter of the fluid conduit at said intersection.

5. In the flow meter of claim 3, a gate system for said alternate trains of square wave pulses responsive to the received sonic signal,
   said gate system comprising means to invert said high frequency square wave from said oscillator and means to invert said gamma pulses and a frequency phase control, said frequency phase control including a NOR gate and a D-type flip-flop, means to apply said inverted gamma pulses to said NOR gate, means including said D-type flip-flop to actuate said gate system to alternately apply said high frequency square wave and said inverted high frequency square wave to said frequency phase control,
   said gate system connecting the output of the crystal receiving said sonic signal to said frequency phase control and the input of said frequency phase control connected to said NOR gate, said NOR gate activating said D-type flip-flop when all of the inputs to the NOR gate are (0); one of the output terminals of said frequency phase control connected on one side to the set side of a D-type flip-flop and the other output terminal of said frequency phase control to the reset side of the said D-type flip-flop;

said means to compare said first and second electrical signals including a flip-flop and means to connect the output of the flip-flop to an integration circuit, the voltage at said integration circuit being a measure of the difference in the delay times of the sonic signal when the alpha pulse train and the beta pulse train are applied.

6. The flow meter of claim 5 in which the crystals are positioned at terminal ends of a tube intersecting the fluid conduit at a non-rectangular angle and having a diameter substantially equal to the diameter of the fluid conduit at said intersection.

* * * * *